United States Patent [19]

Vyas

[11] Patent Number: 5,660,600
[45] Date of Patent: Aug. 26, 1997

[54] BATTERIES AND MATERIALS USEFUL THEREIN

[75] Inventor: Brijesh Vyas, Warren, N.J.

[73] Assignee: Lucent Technologies Inc., Murray Hill, N.J.

[21] Appl. No.: 410,552

[22] Filed: Mar. 24, 1995

Related U.S. Application Data

[63] Continuation of Ser. No. 100,021, Jul. 30, 1993, abandoned, which is a continuation-in-part of Ser. No. 784,485, Oct. 29, 1991, abandoned.

[51] Int. Cl.$^6$ .................................................. H01M 4/16
[52] U.S. Cl. ................................... 29/623.5; 205/63
[58] Field of Search .......................... 429/225, 227, 429/228; 423/434, 619; 29/623.1, 623.5; 205/63

[56] References Cited

U.S. PATENT DOCUMENTS

| | | | |
|---|---|---|---|
| 1,944,065 | 1/1934 | Chamberlain | 429/227 |
| 3,607,408 | 9/1971 | Duddy | 429/227 X |
| 3,765,943 | 10/1973 | Biagetti | 429/227 X |
| 4,081,899 | 4/1978 | Thornton | 29/623.2 |
| 5,149,606 | 9/1992 | Bullock et al. | 429/228 |

FOREIGN PATENT DOCUMENTS 59-184454  10/1994  Japan ............... H01M 4/20

*Primary Examiner*—Anthony Skapars
*Attorney, Agent, or Firm*—Bruce S. Schneider; Scott J. Rittman

[57] ABSTRACT

Batteries based on lead chemistry, e.g., lead-acid batteries, are substantially improved through the use of a particular positive material. This material is formed by the electrochemical conversion of tetrabasic lead sulfate (TTB) where this TTB is synthesized at a pH in the range 9.3 to 12 and under reaction conditions that provide a substantial excess of sulfate to the reactive lead. The resulting materials provide needle-like structures with a width generally in the range 3 to 1 μm. The relative narrow needles, when employed on the positive electrode of a lead acid battery, improve the efficiency of formation, provide good adhesive to the positive plate, extend battery life, as well as, yield excellent capacity per gram of active material.

9 Claims, 4 Drawing Sheets

BATTERIES AND MATERIALS USEFUL THEREIN

CROSS-REFERENCE TO RELATED APPLICATION

This application is a continuation of application Ser. No. 08/100,021, filed on Jul. 30, 1993, now abandoned which is a continuation-in-part of U.S. patent application Ser. No. 07/784,485, filed on Oct. 29, 1996, now abandoned, which is hereby incorporated by reference.

BACKGROUND OF THE INVENTION

1. Technical Field

This invention relates to batteries, and in particular, batteries based on lead chemistry.

2. Art Background

Batteries, such as lead acid batteries, are ubiquitous in today's society. Lead batteries are employed for many Uses such as in the electrical systems of automobiles. Additionally, these batteries are employed in applications such as emergency power for telecommunication systems where occasional, but extremely reliable, use is necessitated. Such diversified use imposes an equal diversity of required properties.

The structure of the positive plate of a lead based battery is a primary factor affecting its life and its current generating efficiency. Lead dioxide is employed as the active positive material. Typically, a paste of a precursor to the lead dioxide is applied to a lead grid to make the positive plate. The precursor is then electrochemically oxidized to the lead dioxide.

In particular, for conventional positive plate fabrication, powders of Pb, PbO, $Pb_3O_4$ or their mixtures are mixed with water and $H_2SO_4$ to form a paste with good adhesivity to the lead grid. This paste, depending on the ratio of starting materials, rate of mixing and the temperature, contains mixtures of the initial powders, lead sulfate, and basic lead sulfates such as $PbOPbSO_4$, $3PbOPbSO_4.H_2O$, and $4PbOPbSO_4$ (TTB). The paste is applied to a lead or lead alloy grid and the plates are cured. Curing consists of exposing the plates to a controlled environment of temperature and humidity, where further reaction of the ingredients occur, resulting in a different ratio of the lead oxides, sulfate, and the basic lead sulfates. The cured plates are then immersed in sulfuric acid where, in a step denominated formation, the paste material is electrochemically oxidized to $PbO_2$, the active material of the positive plate of the lead acid battery.

TTB, which crystallizes as large elongated prismatic (needle shape) crystals, undergoes anodic conversion to $PbO_2$ without losing the prismatic structure. The interlocking of these prismatic crystals provides mechanical strength to the positive plate and are thus less susceptible to shedding during battery cycling. For this reason, batteries for deep cycling are generally manufactured with a large amount of TTB in the active material at the end of the curing process. The large crystals of TTB typically employed provide strength to the positive electrode during use, but their formation is inefficient and their utilization (capacity per gram of active material) is lower than other oxides. Indeed, electrodes made with a large amount of TTB have up to 25% less capacity than conventional electrodes and often require up to 30 deep charge-discharge cycles to reach their rated capacity.

Biagetti (U.S. Pat. No. 3,765,943, dated Oct. 16, 1973) discloses a process to produce TTB crystals by reacting, at a temperature above 70° C., stoichiometric ratios of orthorhombic PbO and sulfuric acid in an aqueous solution using a slowly stirred reaction vessel. Plates are made by mixing the resulting TTB with water and applying the resulting paste to a lead grid. These plates containing essentially 100% TTB have long life. However, as discussed, the oxidation of the TTB to $PbO_2$ is relatively inefficient due to the large size of the crystals employed.

Thus, although prismatic crystals of TTB improve the adhesion of active material during use, their performance has not been entirely satisfactory. The capacity per gram of active material is generally lower than plates formed by conventional techniques. Additionally, conversion from the precursor into the active material is relatively slow. Improvement in conventional lead acid batteries, and in particular, the lifetime of such batteries, is quite desirable. Approaches for use of new precursor crystals have indeed generated hope that lifetime can be improved. Nevertheless, these approaches, although offering enhanced lifetimes, often yield batteries that are somewhat inefficient to produce and that have reduced capacity per gram of active material.

SUMMARY OF THE INVENTION

The use of a specific precursor positive electrode material yields adhesion characteristic of TTB and yet provides improved capacity and formation efficiency relative to conventional materials. This invention involves the reaction of lead oxide with an excess of sulfate. Various forms of lead oxide are useful. For example, it is possible to use orthorhombic lead oxide, tetragonal lead oxide, a combination of orthorhombic and tetragonal lead oxide, or leady oxide. (Leady oxide is a term of art which includes combinations of elemental lead with lead oxide primarily in the tetragonal crystal structure having a relative mole fraction of lead to lead oxide in the range 10 to 50%.) In one embodiment, a precursor is prepared by reacting lead oxide with sulfuric acid in the presence of an excess of sulfate to form a paste and applying the paste to a grid with subsequent curing. Control of the temperature below 60° C. in the reaction medium and of the sulfate excess yields, after curing at a temperature above 70° C. and 100% humidity, a positive plate having an extremely uniform prismatic size, TTB and a uniform pore distribution. Most significantly, the width of these crystals is extremely narrow—having average dimension in the range 1 to 2 microns—allowing rapid conversion to lead oxide from the precursor and further providing enhanced adhesion and current capacity attributes. Thus, the lead dioxide obtained after conversion has prismatic crystals with an average crystal width typically less than 2.5 μm. The formation of a paste when leady oxide is employed as an initial reactant is performed in the manner described except a stream of air is directed onto the paste to aid in the oxidation of the elemental lead. However, the addition of elemental lead has a tendency to increase slightly the average crystal size.

In a second embodiment, TTB of relative small prismatic size is achieved by just reacting lead oxide with sulfuric acid in a stirred aqueous solution containing excess sulfate at temperatures above 60° C. to immediately form TTB. The TTB is mixed with water to form a paste. Positive plates made by applying this paste to a lead grid and converted to lead dioxide, also have higher current capacity attributes.

DETAILED DESCRIPTION

Figure 1:
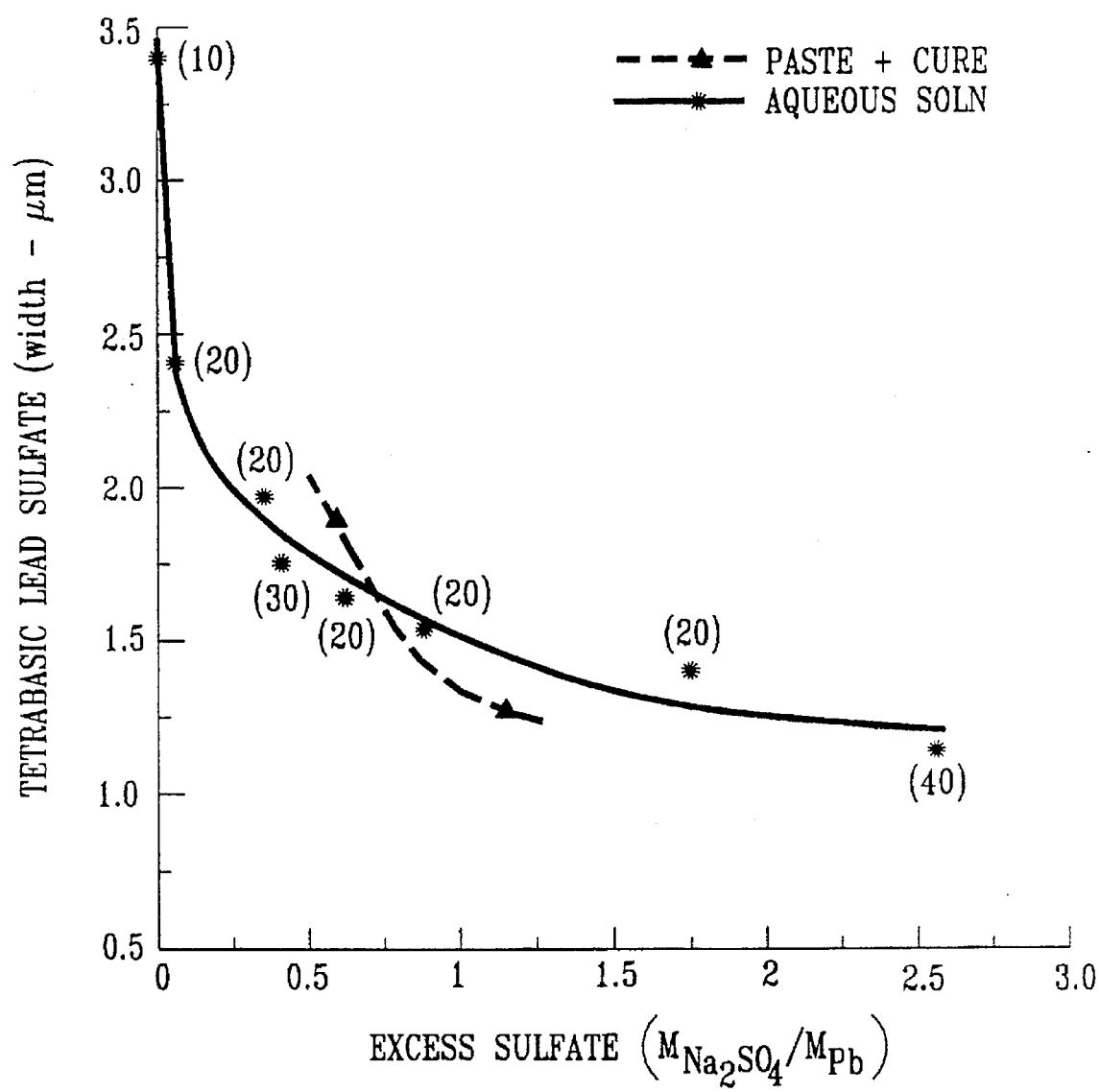
FIG. 1 is a graph plotting the average width of the TTB crystals versus the excess sulfate per reactive lead in the reaction.

As discussed, the invention involves a battery based on lead chemistry having a lead dioxide positive plate. The battery includes a positive plate, a negative plate, and electrolyte medium. The composition of the cathode and electrolyte are not critical and are typical those used in conventional batteries. A wide variety of suitable electrolytes and negative electrodes are described in compendiums such as "Storage Batteries", G. W. Vinal, John Wiley & Sons, 1955, "Storage Batteries and Rechargeable Cell Technology", L. F. Martin, Noyess Data Corp., 1974, and "Electrochemical Power Sources", ed. M. Barak, Peter Perogrinus Ltd., 1980. Briefly, typical electrolytes include sulfuric acid of a molarity in the range of 3 to 6, and typical negative materials generally include a combination of elemental lead an expander. A variety of geometries are available for the battery structure and conventional geometries such as described in Vinal, Martin, and Barak supra are employable.

The material used as the electrochemically active component of the positive electrode should have a specific composition; i.e., should have a prismatic crystal structure with an average dimension measured normal to the long axis of less than 3 microns. Compositions satisfying this criterion are preferably produced by a specific reaction sequence to form a precursor material with subsequent electrochemical conversion of this precursor to the desired lead dioxide composition. Conversion of the precursor to the lead dioxide is accomplished by conventional techniques such as described in Vinal, Martin, and Barak supra. Typically, such conversion techniques involve electrochemical oxidation of the precursor applied to a supporting structure such as a lead grid.

The precursor for the above described conversion is formed by reacting lead oxide with sulfuric acid, for example, as described by Biagetti supra (which is hereby incorporated by reference) but in the presence of an excess of sulfate. Typically, for conversion, this reaction is performed in an aqueous medium. This aqueous medium includes the sulfate present as a sulfate salt such as sodium sulfate. The pH and temperature of the reaction medium and the quantity of sulfate present relative to lead determines whether TTB is obtained. Bode, H. and Voss, E., *Electrochemica Acta*, Vol 1, p 318–325, 1959, and "Lead-Acid Batteries", H. Bode, John Wiley & Sons, 1977. Generally the pH of the reaction medium should be in the range 9.35 to 12. For a pH below 9.35, TTB is not formed, while for a pH above 12, lead monoxide is stable. To form TTB directly without curing, the temperature of the reacting medium should be greater than 60° C., preferably 80° to 90° C. Below 80° C. the reaction begins to slow and above 100° C. the water boils leading to loss of experimental control. Temperatures below 60° C. result in only tribasic lead sulfate and the two polymorphs, tetragonal and orthorhombic, of lead monoxide. Conversion of this combination to TTB is effected by subsequent heating (such as curing) to above 70° C.

Provided the pH and temperature are maintained in the desired range, 1 mole of sulfate reacts with 5 moles of lead oxide to form TTB. The effect of sulfate in excess of the stoichiometric amount is shown in FIG. 1. As can be seen, the average dimension achieved is strongly dependent on the degree of sulfate excess. Generally, to obtain the desired crystal dimensions, a sulfate excess relative to reactive lead (i.e. the ratio of excess sulfate in moles above stoichiometry to the amount of lead present in moles) should be greater than 0.1, preferably in the range 0.2 to 2. This excess generally is obtained by adding sodium sulfate.

Generally, for reactions done at temperatures above 60° C., the reaction of sulfuric acid with lead oxide is continued over a time period of 2 to 4 hours. Reaction times of less than 2 hours often tend to yield incomplete reaction, while reaction times longer than 6 hours, although not precluded, are inefficient and thus uneconomic. However, the presence of substantial tetragonal lead oxide and/or elemental lead increases reaction time. Thus, for 78 wt %, tetragonal lead oxide reaction time in the range 6 to 10 hours are employed while for leady oxide reaction times in the range 16 to 24 hours are used. Reaction performed at temperatures below 60° C. should be done in a medium having a pastey consistency, i.e. a liquid to solids ratio of about 2 or less. In this embodiment, the precursor is prepared by reacting lead oxide with sulfuric acid in the presence of an excess of sulfate to form a paste and applying the paste to a grid with subsequent curing. The paste is pasted onto lead grids and cured, by exposure to a control environment of temperature greater than 70° C. and high relative humidity (typically 100%) from 6 to 16 hours. The curing gives in-situ precipitation of small TTB crystals, the size dependent on the sulfate excess relative to reactive lead, FIG. 1. In addition, in this embodiment, a uniform pore distribution is obtained which also aids in the superior performance of the positive plate. This reaction sequence based on an initial formation of tribasic lead at below 60° C. has the advantage of yielding unusually narrow TTB crystal size distribution.

The reactive lead should be introduced as orthorhombic lead oxide (i.e., at least 80% mole percent should be in the orthorhombic form). Use of other forms of lead oxide is not precluded. In particular, use of tetragonal lead oxide is also possible. It has also been found that a combination of tetragonal and orthorhombic lead oxide produces acceptable results. Generally, the ratio between orthorhombic and tetragonal lead oxide is not critical but generally crystal size is greater as the percentage of tetragonal material mole fraction s increased. Additionally, it is possible to employ leady oxide. When leady oxide is employed, the mixing of the subsequent paste is advantageously done under a stream of air. The use of an air stream is believed to aid in the conversion of the elemental lead into lead oxide.

The following examples are illustrative of batteries within the invention and methods of their fabrication.

EXAMPLE 1

Tetrabasic lead sulfate (TTB) was synthesized by reacting orthorhombic lead oxide (PbO) with a stoichiometric amount of sulfuric acid. A solution (100 cc) containing varying amounts of Na$_2$ SO$_4$ between 0.001 to 0.05M and acidified to pH=2 by adding H$_2$ SO$_4$, was heated to 85° C., and then the PbO (5 gms. of Pb) was added to it. The mixture was stirred for approximately 4 hours at this temperature and continuously titrated with the remaining $H_2SO_4$ to maintain a constant pH of 10. Conversion to TTB was indicated by a change in the color of the solution from bright yellow to a sandy color. The solution was allowed to cool below 35° C., with stirring, the product was filtered, dried in a vacuum oven at 35° C. and the solid phase was confirmed by x-ray diffraction. Larger quantities of TTB were synthesized in a similar fashion by reacting either 25 gms. or 200 gms. of lead oxide in 200 or 1000 cc of 0.5M $Na_2SO_4$ solutions respectively (Table I).

TABLE I

| Reaction No. | PbO (gms.) | Na$_2$SO$_4$ (ml.) | (M) | Ratio ($M_{Na_2SO_4}/M_{Pb}$) | TTB width (µm.) |
| --- | --- | --- | --- | --- | --- |
| 1 | 5.39 | 100 | 0 | 0.0 | 3.46 |
| 2 | 5.39 | 100 | 0.001 | 0.035 | 2.38 |
| 3 | 5.39 | 100 | 0.01 | 0.35 | 1.96 |
| 4 | 5.39 | 100 | 0.05 | 1.73 | 1.43 |
| 5 | 25 | 200 | 0.5 | 0.92 | 1.52 |
| 6 | 200 | 1000 | 0.5 | 0.58 | 1.65 |

Monobasic lead sulfate ($PbO.PbSO_4$) and tribasic lead sulfate ($3PbO.PbSO_4.H_2O$) were prepared by reacting stoichiometric amounts of PbO and $H_2SO_4$. PbO was added to water acidified to pH=2 with $H_2SO_4$ and at 55° C. and then adding the remaining acid drop wise with stirring. The products were dried and the phases confirmed by x-ray diffraction. TTB was also synthesized by reacting the mono- and tribasic lead sulfate (5 gms. Pb) with 0.5M and 0.1M NaOH solution, respectively, at 85° C. The solution was titrated to a constant pH of 10. Cooling and separation were as described above. In all cases, the resultant TTB crystals were examined by scanning electron microscopy and their size measured at 2460X magnification.

FIG. 1 is a plot of the size (mean width) of the TTB particle synthesized in the presence of varying mounts of sulfate present in the solution during the reaction. The size of the TTB decreased as the excess sulfate concentration increased. The point marked (10) is the TTB produced with no $Na_2SO_4$ added. The points marked (20) were in the presence of excess sulfate added as $Na_2SO_4$. The points marked (30) and (40) are for reaction of $3PbO.PbSO_4.H_2O$ and $PbO.PbSO_4$ with NaOH as shown in the following equations:

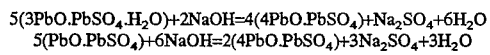

The length of the particles varied from 10 to 30 microns on all the reactions. However, on observation, it was found that many of the particles were broken, probably due to excessive stirring and handling, and therefore, they could not be accurately measured. There was a distinct variation in the width of the particles that could be accurately measured. (The width has the largest effect on the resultant surface area per gram of the active material precipitated and directly effects the electrochemistry of the charge-discharge reaction.)

EXAMPLE 2

Pastes were made by adding water to the TTB powders made in Example 1, reaction nos. 1, 3 and 4, and these pastes were attached to a lead grid (3×3×0.076 cm.). The resultant electrode was dried in moist air at 40° C. for 24 hours followed by further drying at room temperature for an additional 24 hours. The porosity of the electrodes was measured by the water pick-up technique. All the electrodes contained approximately 2 grams of TTB and had a porosity of 68 to 71%. The electrodes were placed between two conventional negative electrodes of the lead-acid system and separated by a 0.5 cm. glass fiber separator. The electrode stack was electrochemically oxidized to $PbO_2$ in 1.020 sp. gr. $H_2SO_4$ (0.42M) at room temperature for 48 hours at 20 mA. The total charge applied represented 200% of that required based on a two electron conversion. All the samples were converted to $PbO_2$ as confirmed by x-ray diffraction. The electrode stack was then transferred to 1.300 sp. gr. $H_2SO_4$ (5.3M) and potentiodynamically cycled between 850 and 1400 mV at a scan rate of 0.1 mV/s. All potentials were measured with a $Hg/HgSO_4$ (1.300 sp. gr. $H_2SO_4$) reference electrode placed close to the working electrode, with no IR correction.

Figure 2:
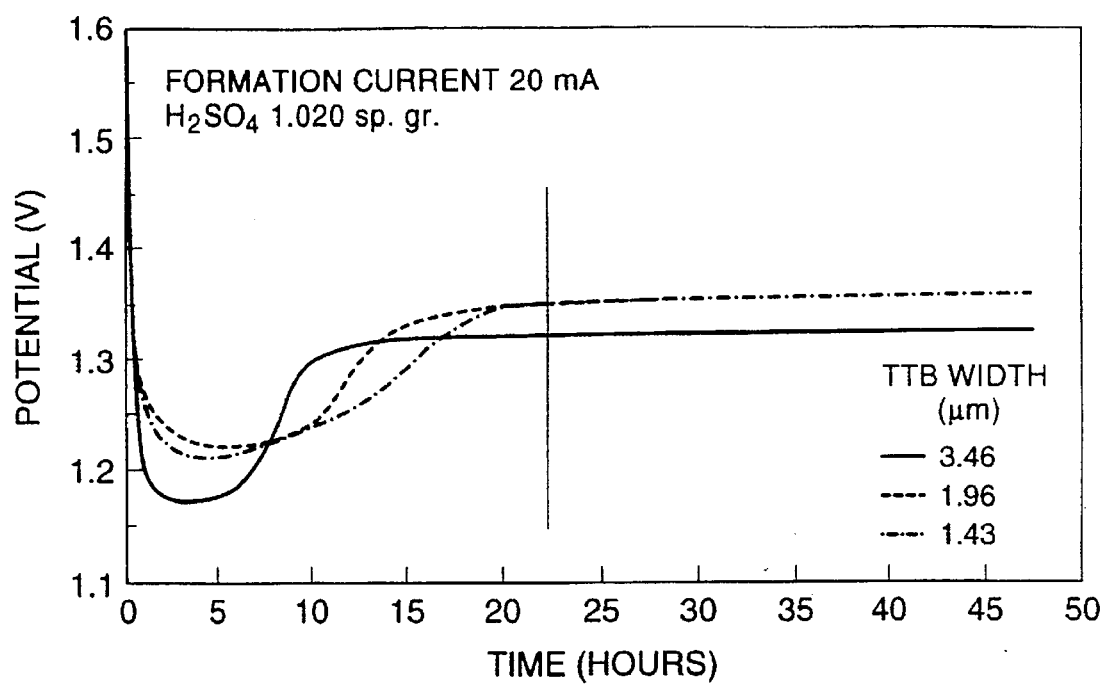
FIG. 2 is positive electrodes potential versus a Hg/HgSO$_4$ (1.3 sp. gr. H$_2$ SO$_4$) reference electrode versus time of formation for reactions 1, 3, and 4 in Example 1.

The potential of the electrodes made with the TTB of different sizes versus time of formation is shown in FIG. 2. All the plates started at a high potential (1.8 V) due to the low conductivity of the TTB. As the formation proceeded and the active material was converted to $PbO_2$, which has close to metallic conductivity, the potential dropped to a minimum. At this potential, the main reaction was conversion of the TTB to $PbO_2$. As more of the surface of the active material was converted, the potential began to rise again and reached a new plateau value. The main electrochemical reaction at this potential was the reaction of water to produce oxygen. However, a small part of the current continued to oxidize the active material to $PbO_2$. Table II represents formation time (time before it reaches a plateau of potential) which is an arbitrary indication of the formation efficiency. These times can be compared to the times required for formation with 100% efficiency. In these experiments, 200% of the theoretical charge required for formation was passed, and all the electrodes were completely converted to $PbO_2$.

TABLE II

| Reaction No. | Active Material (gms.) | Formations (hours) | Capacity (mAh) | Utilization (mAh/gm) |
| --- | --- | --- | --- | --- |
| 1 | 2.06 | 8.4 | 131 | 64 |
| 3 | 1.94 | 12.0 | 209 | 107 |
| 4 | 1.97 | 14.1 | 278 | 141 |

Figure 3:
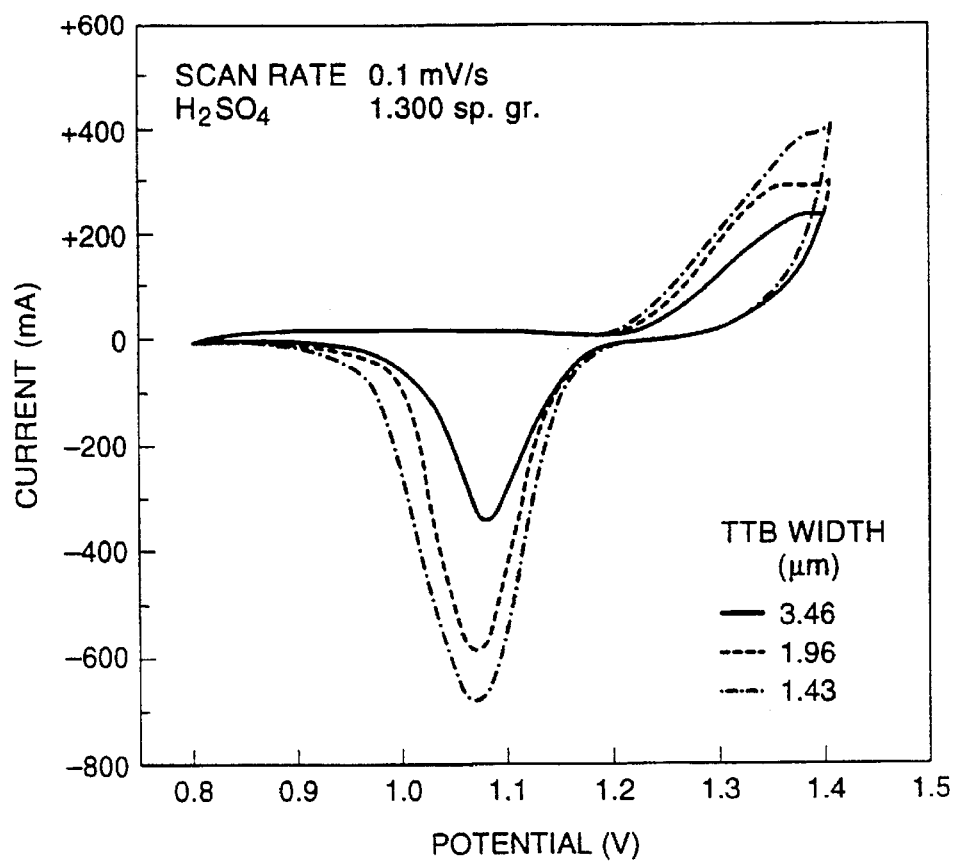
FIG. 3 is cyclic voltagrams (potential versus current) for positive electrodes indicating increasing capacity with decrease in TTB crystal size.

After formation, the electrode stack was cycled in 1.300 sp. gr. $H_2SO_4$, the acid of interest in the battery. The cyclic voltagrams for the 5th cycles for the electrodes of decreasing size of the TTB is shown in FIG. 3. The area under the curve in the negative current direction represents the discharge reaction and is an indication of the capacity of the three electrodes. It is clear that the capacity of the electrode increased as the initial particle size of the TTB decreased. On the first discharge, the capacity realized was low since the electrode and the separator still contained the lower concentration of the formation acid. The capacity increased to a stable value on the 3rd cycle and this value continued over the next five cycles.

EXAMPLE 3

A paste was prepared by reacting 5 moles of orthorhombic PbO with 1 mole of $H_2SO_4$ in presence of amounts of $Na_2SO_4$ ranging from 0.05 to 1.0M. Orthorhombic PbO (200 gm.) was added to 23 ml of $Na_2SO_4$ solution, acidified to a pH of 2 by the addition of $H_2SO_4$, and mixed thoroughly for half an hour. Then the remaining 1.3 sp. gr. $H_2SO_4$ was added to the mixture at a rate of about 1 ml/min and continued the mixing of the resultant paste. The reaction of the acid with the PbO is exothermic and raises the temperature of the paste. Therefore, the rate of the acid addition was controlled to keep the temperature of the paste below 50° C. After all the acid was added, the paste was mixed for another half an hour until it had a smooth consistency and was then allowed to cool to room temperature. The density of the paste was obtained by measuring its weight in a precision cup of a fixed volume of two cubic inches and was 3.85 gms/ml. X-ray diffraction was used to determine the phases present in the paste. The paste was applied to 0.2 in. thick lead grids and the resultant plates were allowed to dry in the ambient atmosphere for 3 hours. The dried plates were cured at 85° C. and 100% humidity for 16 hours. After removing from the oven, they were allowed to cool to room temperature, washed for 3 hours in flowing deionized water, and dried at 50° C. overnight. Pellets (1.25 cm by 1.78 cm) were removed from the dry plate for further investigations. The phases present were determined by x-rays and the crystal size by scanning electron microscopy. In addition, the porosity and the pore size distribution of the pellet was determined by Hg porosimetry. The results are shown in Table III.

$Na_2SO_4$ to the paste. Although the total porosity of the plates for reactions 10 to 12 are similar, their median pore size is significantly changed. Also, most of the porosity is achieved with pores of dimension close to the median pore size. Thus, the process described provides means to control the crystal size of the TTB and controls the macroscopic structure of the positive plate by controlling the porosity, pore distribution, and surface area of the plate.

EXAMPLE 4

A large batch of paste was made by reacting 3 Kg of PbO with stoichiometric mount of $H_2SO_4$ in the presence of 0.5M $Na_2SO_4$ by mixing the ingredients in a fixed speed laboratory paste mixer using the procedure described in Example 3. The large batch was used to make 6.5 in.×7.0 in.×0.2 in. positive, plates for cycling tests and compared versus control plates. Control plates were made by making a paste of 75% TTB (reaction 1, containing no $Na_2SO_4$), 25% $Pb_3O_4$ and water to a density of 4.2 gm/ml and pasting to lead grids. The control plates were then dried at 40° C. for 72 hours. The experimental and control plates were electrochemically oxidized to $PbO_2$ (formation) at 2.5 A in 1.020 sp. gr. $H_2SO_4$ (0.42M) at room temperature for 72 hours. The total charge applied represents greater than 150% of required based on a

TABLE III

| | | | | | | Plate | | | |
|---|---|---|---|---|---|---|---|---|---|
| Reaction | PbO (gms) | $Na_2SO_4$ (M) | ratio ($M_{Na_2SO_4}/M_{Pb}$) | Phases in Paste* | Phases after Cure | TTB width (μm) | Porosity (%) | Median Pore (μm) | Area (m²/gm) |
| 9 | 200 | 0 | 0.0 | TRL, t-PbO, O-PbO | TTB, TRL t-PbO, O-PbO | | | | |
| 10 | 200 | 0.05 | 0.056 | TPL, t-PbO, O-PbO | TTB | 15–20 | 52 | 13.6 | 2.5 |
| 11 | 200 | 0.5 | 0.56 | TRL, t-PbO, O-PbO | TTB | 1.92 | 53 | 5.7 | 2.7 |
| 12 | 200 | 1.0 | 1.16 | TRL, t-PbO, O-PbO | TTB | 1.26 | 54 | 4.4 | 2.8 |

Figure 4:
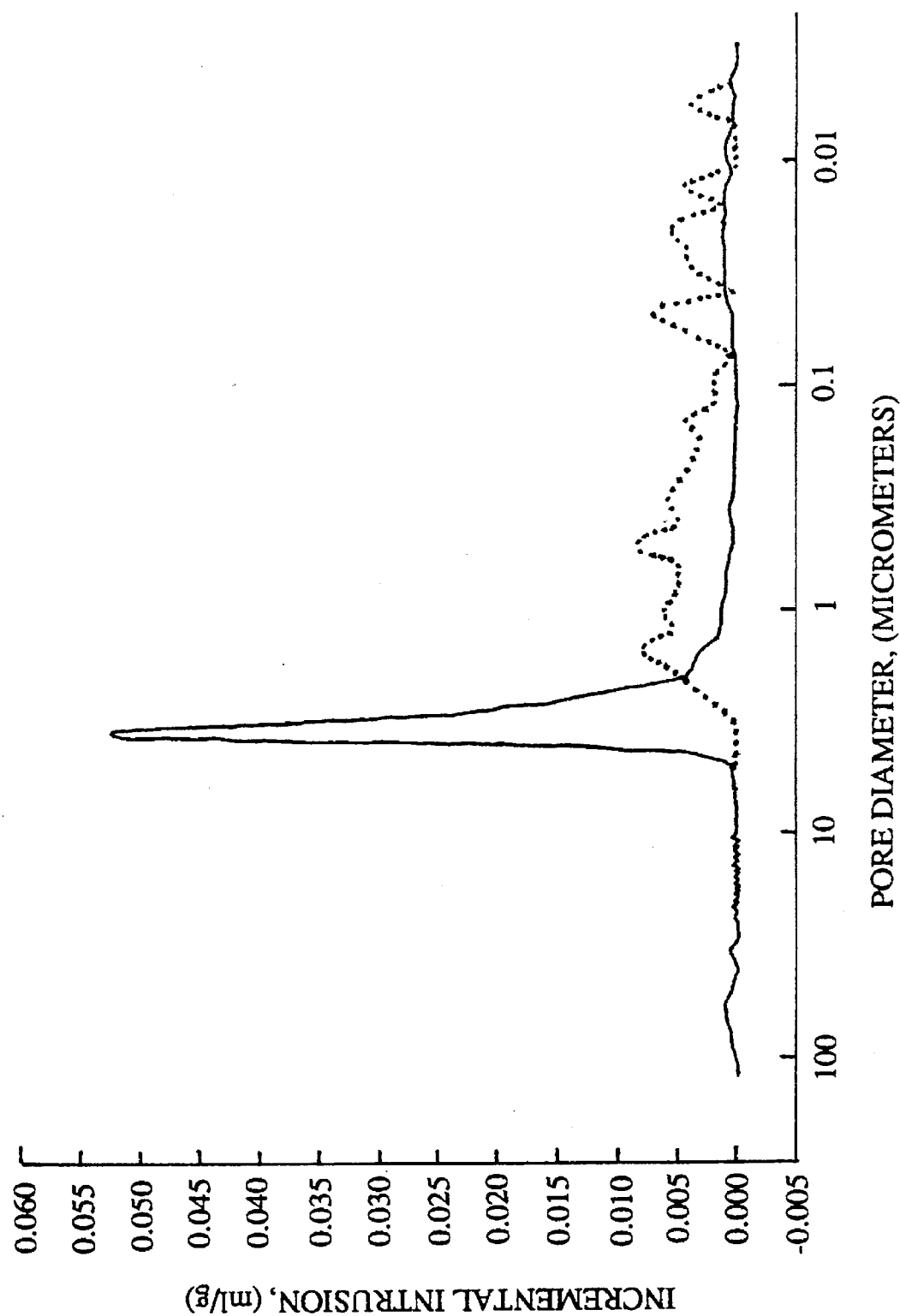
FIG. 4 is pore size distribution, pore volume versus pore diameter for experimental and control positive plates after formation prepared as described in Example 4.
Figure 5:
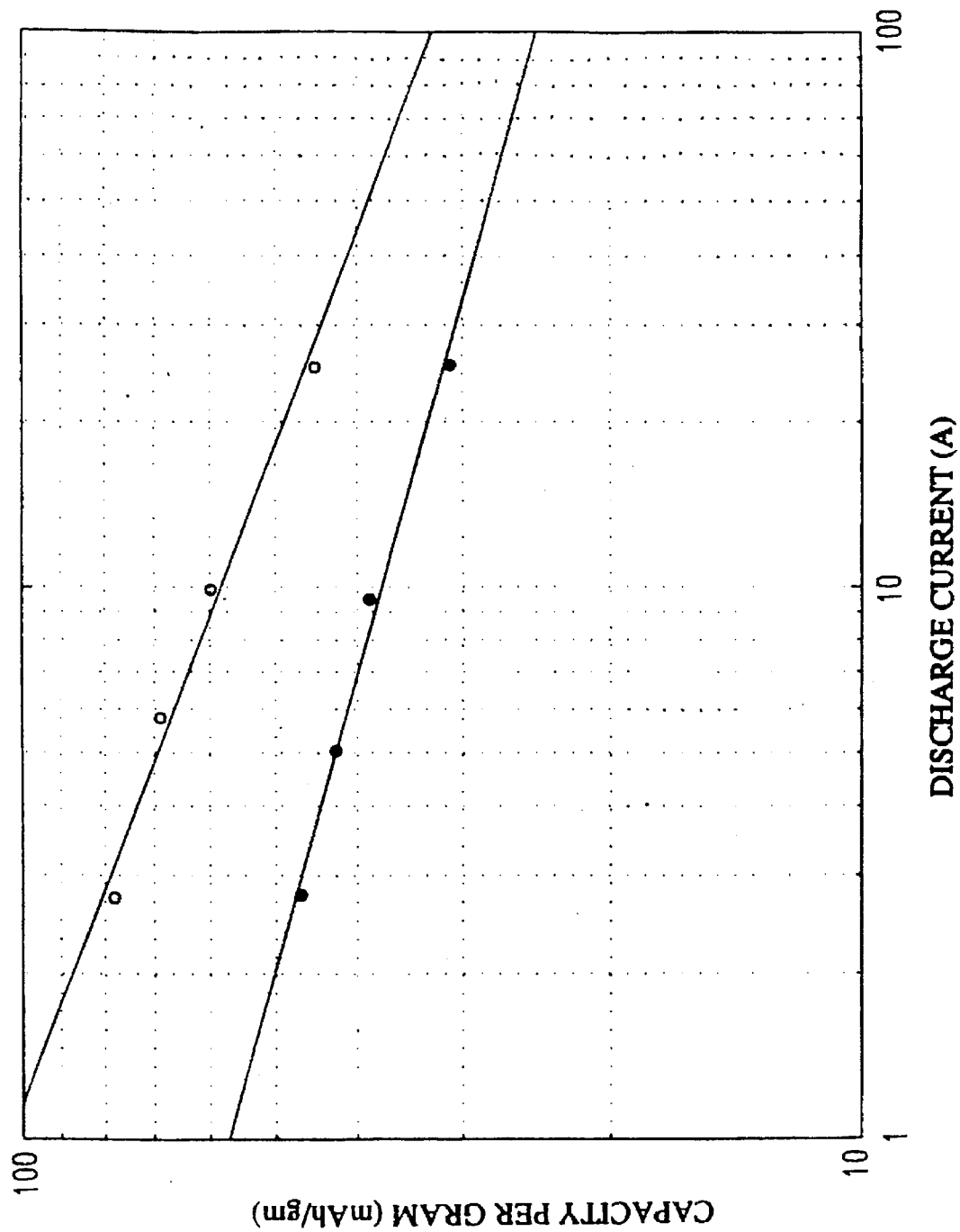
FIG. 5 is utilization, capacity per gain of active material versus discharge current indicating the higher utilization of the experimental plates over the control plates of Example 4.

TRL = $3PbO.PbSo_4.H_2O$
t-PbO = tetragonal lead monoxide
O-PbO = orthogonal lead monoxide In all the experiments, the phases present in the paste before curing were tribasic lead sulfate ($3PbO.PbSO_4.H_2O$) and the two polymorphs, tetragonal and orthogonal, lead monoxide. These are the only phases that are stable in the reaction if the temperature of the paste is kept below 60° C. If the temperature of the paste rises above 60° C., TTB is formed in the paste and this results in a random distribution of TTB crystal sizes after curing. Thus, as discussed, maintaining the temperature of the paste below 60° C., preferably in the region of 50° C., is important if the tightest size distribution is desired. The paste made with no addition of $Na_2SO_4$ (reaction 9) did not result in complete conversion to TTB upon subsequent curing at 85° C. and 100% humidity for 16 hours. Pastes of this formulation were also cured for 72 hours without complete conversion. In contrast, reactions 10, 11, and 12 with varying amounts of $Na_2SO_4$ also had tribasic lead sulfate, tetragonal, and orthorhombic lead monoxide in the paste, however, on subsequent curing, they were completely converted to TTB as detected by x-rays. For the paste with 0.05M $Na_2SO_4$ the TTB crystals were relatively large-100 microns long and width of 15–20 microns. In the case of the pastes prepared with 0.5M and 1.0M $Na_2SO_4$, the TTB crystals were significantly smaller-20–30 microns long and 1–2 microns wide. FIG. 1. The sizes are similar to that found in the reactions conducted in a stirred aqueous solution (reactions 2–6). In addition to controlling the crystal size, the porosity distribution is affected by the addition of two electron conversion. All the samples were convened to $PbO_2$ as confirmed by x-ray diffraction. Hg porosimetry was used to determine the pore distribution of the experimental and control plates, FIG. 4. The total porosity of the two types of plates were similar (49% for the experimental plate and 46% for the control plates), however, the pore distribution was significantly different. Most of the pores in the experimental plates were in the 4 to 1.5 microns while in the control plates, pores of 2 to 0.005 microns were randomly distributed.

For cycling tests, the positive plate was placed between two negative lead plates and separated by a glass fiber matt and placed in 1.300 sp. gr $H_2SO_4$ (5.3M). The plates were charged to a constant cell potential of 2.4 V and discharged at a constant current to a cutoff voltage of 1.75 V. After about 40 one-day cycles—discharge discharge for 4 hours at the 5.8 A and 5 A for the experimental and control plates respectively, and charged to 2.4 V for the remaining 20 hours with maximum current of 2.5 A, the cells were discharged at different currents and two days of charge. The capacity per gram of the active material for the experimental and control plates is shown in FIG. 6. The experimental plates show greater than 40% higher capacity per gram over all the discharge rates (25 A to 2.5 A) tested.

Examples were performed to demonstrate the effect of various initial reactant compositions. The lead oxide powders used were 1) 100% orthorhombic lead oxide, 2) yellow oxide containing ~85% onhorhombic PbO and ~15% tetragonal PbO, 3) litharge containing ~22% orthogonal PbO and ~78% tetragonal PbO and 4) leady oxide containing about 80% tetragonal PbO and remaining free metallic Pb.

EXAMPLE 5

Tetra basic lead sulfate was synthesized by reacting the various lead oxide powders with a stoichiometric mount of sulfuric acid in the presence of sodium sulfate. The various powders (5 gm of Pb) were added to 100 ml of solution containing either 0.001 or 0.01M of $Na_2SO_4$, acidified to pH 2 by adding $H_2SO_4$ and heated to 85° C. To the solution, the remaining $H_2SO_4$ was added at a controlled rate to maintain the pH of 10. The reaction time for the orthorhombic PbO and the yellow oxide was ~4 hours, and for the litharge about 6 hours were required. The leady oxide had to be digested overnight, about 18 hours and a stream of oxygen was bubbled through the solution to aid the oxidation of the metallic lead to PbO. After the reaction the solution was allowed to cool below 35° C. dried in vacuum and the solid phase analyzed by x-ray diffraction. Table IV gives the width of the tetra basic crystals for the various reactions.

TABLE IV

| Reaction No. | Oxide | $Na_2SO_4$ (M) | TTB size (microns) |
| --- | --- | --- | --- |
| 1 | 100% Orthorhombic | 0.001 | 2.42 |
| 2 | 100% Orthorhombic | 0.01 | 1.86 |
| 3 | Yellow oxide | 0.001 | 2.36 |
| 4 | Yellow oxide | 0.01 | 1.93 |
| 5 | Litharge | 0.001 | 2.27 |
| 6 | Litharge | 0.01 | 2.08 |
| 7 | Leady Oxide | 0.001 | 2.72 |
| 8 | Leady Oxide | 0.01 | 2.14 |

EXAMPLE 6

Pastes were prepared by reacting the various powders with a stoichiometric amount of sulfuric acid in a small quantity of liquid. 200 gm. of the powders were added to 23 ml of solution containing 3.30 gm of $Na_2SO_4$ acidified to pH=2 by the addition of $H_2SO_4$ and mixed thoroughly for half an hour. The mixing was continued and the remaining 1.4 sp. gr. acid was added at a rate of about 1 ml/min. The reaction of the acid is exothermic and therefore the acid addition rate was controlled to keep the temperature of the paste below 55° C. After all the acid was added the resultant paste was mixed for an addition half an hour until it had smooth consistency and was cooled to below 35° C. The density of the paste was obtained by measuring its weight in a precision cup of fixed volume of two cubic inches and the phases present in the paste determined by x-ray diffraction. For the reaction with leady oxide a stream of air was blown over the paste to aid the oxidation of the metallic lead to lead oxide. This use of air also tended to cool the temperature of the paste and, thus, the acid rate was adjusted to keep the temperature of the paste around 50° C. X-ray diffraction detected tribasic lead sulfate, tetragonal lead oxide and orthogonal lead oxide in the paste with all the lead oxide powders. For the leady oxide in addition to tribasic lead sulfate, tetragonal lead oxide and orthogonal lead oxide some metallic lead was also found and this was confirmed to be ~8% of the paste mixture by chemical wet analysis. The paste was applied to a 0.2 in thick lead grid and allowed to dry in an ambient atmosphere for at least three hours. The dried plates were cured at 85° C. and 100% humidity for 16 hours. After removing from the oven, they were allowed to cool, washed in water for 3 hours and and dried at 50° C. for 16 hours. Pellets removed from the dried plates were analyzed by x-ray diffraction and scanning electron microscopy (SEM). All the samples had reacted to form tetra basic lead sulfate as detected by x-ray diffraction. No residual metallic lead was found in the reaction with leady oxide as measured by wet chemical analysis, thus the metallic lead not reacted in the paste making operation is reacted completely in th curing step. The crystal size of the tetra basic lead sulfate for the various oxide powders is listed in Table V.

In the reaction with leady oxide, on isolated location some (<1% of the tetra basic lead sulfate crystals) lead oxide was also found. This is caused by the nature of the leady oxide; the leady oxide is supposed to have an average size of about 4–5 microns and each particle should have a core of metallic lead with a covering of tetragonal lead oxide. However, on examining the powder used, a few particles of about 10 microns of primarily metallic lead were also found. It is believed that these particles are responsible for the local failure to complete the reaction and the resultant lead oxide left in this sample.

TABLE V

| Reaction No. | Oxide | TTB size (microns) |
| --- | --- | --- |
| 1 | 100% Orthorhombic | 1.68 |
| 2 | Yellow oxide | 1.73 |
| 3 | Litharge | 2.15 |
| 4 | Leady Oxide | 2.48 |

EXAMPLE 7

Pastes were also prepared by reacting leady oxide with varying mounts of sulfuric acid such that 60 to 100% of the lead in the total leady oxide was reacted to form tetra basic lead sulfate in a procedure similar to Example 6. In all samples the phases present were mainly tetra basic lead sulfate and tetragonal lead oxide with a trace of orthorhombic lead oxide. As shown in Table VI the size of the tetra basic lead sulfate is primarily controlled by the amount of $Na_2SO_4$ present in the paste.

TABLE VI

| Reaction No. | % Pb Reacted | $Na_2SO_4$ | TTB size (microns) |
| --- | --- | --- | --- |
| 1 | 100 | 0.5 | 1.54 |
| 2 | 85 | 0.2 | 2.98 |
| 3 | 85 | 0.5 | 1.78 |
| 4 | 80 | 0.5 | 2.34 |
| 5 | 75 | 0.5 | 2.16 |
| 6 | 70 | 0.5 | 2.46 |
| 7 | 66 | 0.5 | 2.72 |
| 8 | 66 | 0.0 | 12.53 |

I claim:

1. A process for fabricating a battery that has a lead based electrode comprising the steps of reacting at a pH in the range 9.35–12 leady oxide with sulfate in the presence of a stoichiometric excess of said sulfate to form a reaction product wherein said reaction is performed at a temperature of at least 60° C. or said reaction product is subjected to a temperature of at least 70° C. at high relative humidity, applying a material comprising at least one component of said reaction product to an electrode structure and converting said material to lead dioxide.

2. The process of claim 1 wherein said reaction is performed in a liquid medium.

3. The process of claim 2 wherein said reaction is performed at a temperature above 60° C.

4. The process of claim 3 wherein said material is formed into a paste.

5. The process of claim 1 wherein said reaction is performed at a temperature below 60° C.

6. The process of claim 5 wherein said material is formed into a paste.

7. The process of claim 6 including the step of curing said paste on said electrode.

8. The process of claim 1 wherein said excess is introduced as a sulfate salt.

9. The process of claim 1 wherein said lead dioxide has a prismatic crystal structure and an average crystal width less than 2.5 μm.

* * * * *